3,527,710
X-RAY INTENSIFIER SCREEN COMPRISING EUROPIUM ACTIVATED BARIUM ORTHOPHOSPHATE PHOSPHOR

Sam Z. Toma and Francis N. Shaffer, Towanda, Pa., assignors to Sylvania Electric Products, Inc., a corporation of Delaware
No Drawing. Filed Sept. 21, 1967, Ser. No. 669,381
Int. Cl. C09k 1/36; H01j 1/63
U.S. Cl. 252—301.4      6 Claims

ABSTRACT OF THE DISCLOSURE $Ba_{2.9-3.1}(PO_4)_2:Eu^{2+}$ has been found to be a suitable phosphor for applications in X-ray intensifier screens and other intensifying devices.

BACKGROUND OF THE INVENTION

Field of the invention

This invention relates to fluorescent phosphors and X-ray intensifying screens embodying such phosphors.

DESCRIPTION OF THE PRIOR ART

In the past, calcium tungstate phosphors were widely used as the fluorescent material for X-ray intensifier screens. Such screens are usually placed against a photographic film for intensifying the effect of X-ray emission. A portion of the X-ray radiation is absorbed by the phosphor and emitted in the blue-violet-ultraviolet region of the spectrum to which the film is sensitive. Phosphors which are selected for such applications should produce sharp, undistorted images which are reproduced upon the film that is placed against it. The screen, such as described in U.S. Pat. 2,968,725 includes a base layer of material, transparent to X-rays and opaque to visible light. A coating of the X-ray-excitable phosphors is disposed upon one side of the screen and dispersed in a binder which is substantially transparent to both the X-ray excitation energy and the blue-violet-ultraviolet emission. The phosphors have a strong absorption for X-radiation in regions of interest and an emission in the blue-violet-ultraviolet region.

SUMMARY OF THE INVENTION

According to the present invention, we have discovered that $Ba_{2.9-3.1}(PO_4)_2:Eu^{2+}$ is a phosphor of superior efficiency under X-ray excitation. Of the alkaline earth metals which could form a series of such phosphors, the barium shows superior efficiencies over both strontium and calcium.

In the following Table I, the efficiencies of the europium activated, alkali earth metal phosphates are compared to each other and to calcium tungstate. The $Ba_3(PO_4)_2:Eu$ was selected as the standard and the efficiencies of the other phosphors were compared to it.

TABLE I

| | Emission peak under UV, nm. | Band width, nm. | Percent relative efficiency (80.) kv X-rays | Percent relative efficiency vs. CaWO$_4$ |
|---|---|---|---|---|
| Ba$_3$(PO$_4$)$_2$ | 413 | 34 | 100 | 204 |
| Sr$_3$(PO$_4$)$_2$ | 408 | 42 | ~50 | |
| Ca$_3$(PO$_4$)$_2$ | ~480 | (¹) | <10 | |

¹ Very broad.

In the barium orthophosphate system, the ratio of Ba/P can be between about 1.45 and 1.55. The europium concentration can be between about $3 \times 10^{-4}$ to 1.0 gram atoms per 2 moles (PO$_4$).

Modifications in the emission characteristics of the $Ba_3(PO_4)_2$ can be achieved by substituting Ca and/or Sr in varying quantities up to about 2.5 gram atoms in place of Ba. Substitution of one gram atom of Sr per two moles of PO$_4$ shifts the emission peak to 420 nm. with good fluorescence efficiency under X-ray excitation. Substitution of one gram atom of Ca per two moles of PO$_4$ broadens and shifts the peak emission to much longer wavelength, more characteristic of pure $Ca_3(PO_4)_2:Eu$ emission.

DESCRIPTION OF PREFERRED EMBODIMENTS

The following specific examples are offered as illustrations of the preferred method of preparing the phosphors and are not intended to be limitations upon the claims.

$Ba_3(PO_4)_2:Eu$—The composition

| | Gram moles |
|---|---|
| BaHPO$_4$ | 2 |
| BaCO$_3$ | 0.98 |
| Eu$_2$O$_3$ | 0.01 | is intimately blended and fired in silica crucible at 1300° C. in air atmosphere for three hours. The fired material is ground and refired in H$_2$—N$_2$ atmosphere at 1150° C. for two hours.

$Ba_2Sr(PO_4)_2:Eu$—The composition

| | Gram moles |
|---|---|
| BaHPO$_4$ | 2 |
| SrCO$_3$ | 0.98 |
| Eu$_2$O$_3$ | 0.01 | is intimately blended and fired in silica crucible at 1250° C. in air atmosphere for three hours. The fired material is ground and refired in H$_2$—N$_2$ atmosphere at 1150° C. for two hours.

$Ba_2Ca(PO_4)_2:Eu$—The composition

| | Gram moles |
|---|---|
| BaHPO$_4$ | 2 |
| CaCO$_3$ | 0.98 |
| Eu$_2$O$_3$ | 0.01 | is intimately blended and fired in silica crucible at 1250° C. in air atmosphere for three hours. The fired material is ground and refired in H$_2$—N$_2$ atmosphere at 1150° C. for two hours.

A method of making intensifying screens is to slurry the appropriate phosphor in a binder, as for example polyvinylbutyral, and spread the mixture at the desired thickness on a plastic or cardboard base. The latter is usually treated with a moisture and fungus resistant preparation before the mixture of the phosphor and binder is applied. After drying, the phosphor surface is then coated with a preparation to give the screen cleanability and resistance to abrasion qualities.

It is apparent that modifications and changes can be made within the spirit and scope of the present invention but it is our intent, however, only to be limited by the scope of the following claims.

As our invention, we claim:

1. An X-ray intensifier screen including base means transparent to X-ray but opaque to ultraviolet-visible light; X-ray excitable means disposed upon said base means, said X-ray excitable means emitting ultraviolet-visible light, said means consisting essentially of barium orthophosphate activated by europium; means for retaining said X-ray excitable means upon said base means.

2. The screen according to claim 1 wherein the chemical formula of said X-ray excitable means is:

$$Ba_{2.9-3.1}(PO_4)_2:Eu$$

3. The screen according to claim 2 wherein the europium concentration is between about $3 \times 10^{-4}$ to 1.0 gram atom per two moles of $PO_4$.

4. The screen according to claim 2 wherein at least one other alkali earth metal is substituted for the barium in said X-ray excitable means.

5. The screen according to claim 4 wherein up to 2.5 gram atoms of said other alkali earth metal is substituted in said formula.

6. The screen according to claim 4 wherein said alkali metal is calcium and/or strontium.

References Cited
UNITED STATES PATENTS 2,366,270   1/1945   Lemmers.
2,427,728   9/1947   Jenkins et al.
3,159,584   12/1964   Wanmaker et al.

OTHER REFERENCES

Chemical Abstracts, vol. 55, p. 19,506(e) 1961.
Chemical Abstracts, vol. 63, p. 10,817(c) 1965.

TOBIAS E. LEVOW, Primary Examiner

R. D. EDMONDS, Assistant Examiner

U.S. Cl. X.R.

250—80